United States Patent [19]

Carter et al.

[11] Patent Number: 4,901,341
[45] Date of Patent: Feb. 13, 1990

[54] METHOD AND APPARATUS FOR CALLER-CONTROLLED RECEIPT AND DELIVERY OF VOICE MESSAGES

[75] Inventors: Howard E. Carter, Denton; Joel A. Pugh, Dallas; Byron C. Pierce, Garland, all of Tex.

[73] Assignee: Messager Partners, Dallas, Tex.

[21] Appl. No.: 342,480

[22] Filed: Apr. 24, 1989

Related U.S. Application Data

[63] Continuation-in-part of Ser. No. 209,891, Jun. 22, 1988, Pat. No. 4,825,460.

[51] Int. Cl.⁴ .................. H04M 1/70; H04M 3/50; H04M 15/10
[52] U.S. Cl. ........................... 379/67; 379/89; 379/112; 379/196
[58] Field of Search ............. 379/67, 88, 89, 84, 379/211, 212, 213, 214, 233, 196, 112

[56] References Cited

U.S. PATENT DOCUMENTS

| | | | |
|---|---|---|---|
| 3,728,486 | 4/1973 | Kraus | 379/69 |
| 3,899,645 | 8/1975 | Brafman | 379/355 |
| 4,371,752 | 2/1983 | Matthews et al. | 379/89 |
| 4,600,809 | 7/1986 | Tatsumi et al. | 379/88 |
| 4,602,129 | 7/1986 | Matthews et al. | 379/84 |
| 4,674,116 | 6/1987 | Curtin et al. | 379/211 |
| 4,696,028 | 9/1987 | Morganstein et al. | 379/88 |
| 4,766,604 | 8/1988 | Axberg | 379/67 |
| 4,777,647 | 10/1988 | Smith et al. | 379/151 |
| 4,792,967 | 12/1988 | Ladd et al. | 379/67 |
| 4,809,321 | 2/1989 | Morganstein et al. | 379/211 |

FOREIGN PATENT DOCUMENTS

| | | | |
|---|---|---|---|
| 0112967 | 7/1984 | European Pat. Off. | |
| 0166393 | 1/1986 | European Pat. Off. | 379/88 |
| 2130848 | 6/1984 | United Kingdom | |

OTHER PUBLICATIONS

"Busy Call Diverter", R. L. Brady et al, *IBM Technical Disclosure Bulletin*, vol. 25, No. 4, Sep. 1982, pp. 2231–2232.

"Calling or Called Number Feature for Telephone System", R. L. Brady et al, *IBM Technical Disclosure Bulletin*, vol. 25, No. 7B, Dec. 1982, pp. 3961–3962.

"Unanswered Call Diverter", R. L. Brady et al., *IBM Technical Disclosure Bulletin*, vol. 25, No. 7A, Dec. 1982, pp. 3480–3481.

*Primary Examiner*—Thomas W. Brown
*Attorney, Agent, or Firm*—David H. Judson

[57] ABSTRACT

A line interface unit for caller-controlled receipt and delivery of voice and/or data meassages over a telephone system having a voice/data message facility, the message facility connectible to at least one calling station and a called station and normally having access prevention circuitry for preventing storage and forwarding of voice/data messages unless predetermined access codes are received and verified by the circuitry. In the preferred embodiment, the unit comprises a switch connected to a central office and having first and second positions and wherein signals are connected directly between the calling station and the central office when the switch is in the first position. The interface unit also includes circuitry for signaling the message facility and circuitry for monitoring call progress upon call initiation to the called station. Microprocessor-based control circuitry responds to detection of a predetermined condition at the called station upon call initiation, to detection of a first predetermined code from the calling station indicating that the caller desires to leave a voice/data message for the called station, and to detection of a second predetermined code from the voice message facility, to establish a connection between the calling station and the message facility. Thereafter, a special data string is transmitted to the message facility which, upon receipt thereby, facilitates barrierless entry in and out of the message facility without the predetermined access codes.

5 Claims, 5 Drawing Sheets

METHOD AND APPARATUS FOR CALLER-CONTROLLED RECEIPT AND DELIVERY OF VOICE MESSAGES

This application is a continuation-in-part of prior co-pending application No. 07/209,891, filed Jun. 22, 1988 now U.S. Pat. No. 4,825,460.

TECHNICAL FIELD

The present invention relates to voice and/or data messaging methods and systems and more particularly to a line interface unit for controlling receipt and delivery of voice and/or data messages over a telephone system having a voice or data message facility connectible to a calling station and a called station via a central office.

BACKGROUND OF THE INVENTION

It is known in the art to operate a multiple paystation telephone installation from a central office. In such systems, the central office typically performs the coin collect, return and verification functions necessary to provide both local and long distance services. Multiple paystation installations of the type described above have recently been enhanced through the use of so called "smart" paystations. Such paystations typically include their own microprocessor and associated memory for supporting various computer programs. These programs provide several desirable operating features, e.g., loop start dialtone and "least cost routing" for long distance telephone calls. Although "smart" paystations are advantageous, such devices have yet to be successfully integrated into voice messaging systems. Paystation operators have therefore been unable to offer message storage/forwarding to users of their paystations.

It would therefore be desirable to provide a line interface unit for use in controlling receipt and delivery of voice and/or data messages in a telephone system which overcomes these and other problems of the prior art and which facilitates the providing of certain call-default and message prompting operations in a stand-alone unit.

BRIEF SUMMARY OF THE INVENTION

In one embodiment of the invention, a line interface unit is described for caller controlled receipt and delivery of voice and/or data messages over a telephone system having a voice/data message facility, the message facility connectible to at least one calling station and a called station and normally having access prevention circuitry for preventing storage and forwarding of voice/data messages unless predetermined access codes are received and verified by the circuitry. In the preferred embodiment, the unit comprises a switch connected to a central office and having first and second positions and wherein signals are connected directly between the calling station and the central office when the switch is in the first position. The interface unit also includes circuitry for signaling the message facility and circuitry for monitoring call progress upon call initiation to the called station. Microprocessor-based control circuitry sequentially responds to (a) detection of a predetermined condition at the called station upon call initiation, (b) detection of a first predetermined code from the calling station indicating that the caller desires to leave a voice/data message for the called station, and (c) detection of a second predetermined code from the voice message facility, to thereby control the switch to establish a connection between the calling station and the message facility. Thereafter, the control circuitry generates a special data string to the message facility which, upon receipt thereby, facilitates barrierless entry in and out of the message facility without the predetermined access codes.

BRIEF DESCRIPTION OF THE DRAWINGS

For a more completed understanding of the present invention and the advantages thereof, reference is now made to the following Description taken in conjunction with the accompanying Drawings in which.

DETAILED DESCRIPTION

Figures 1, 2:
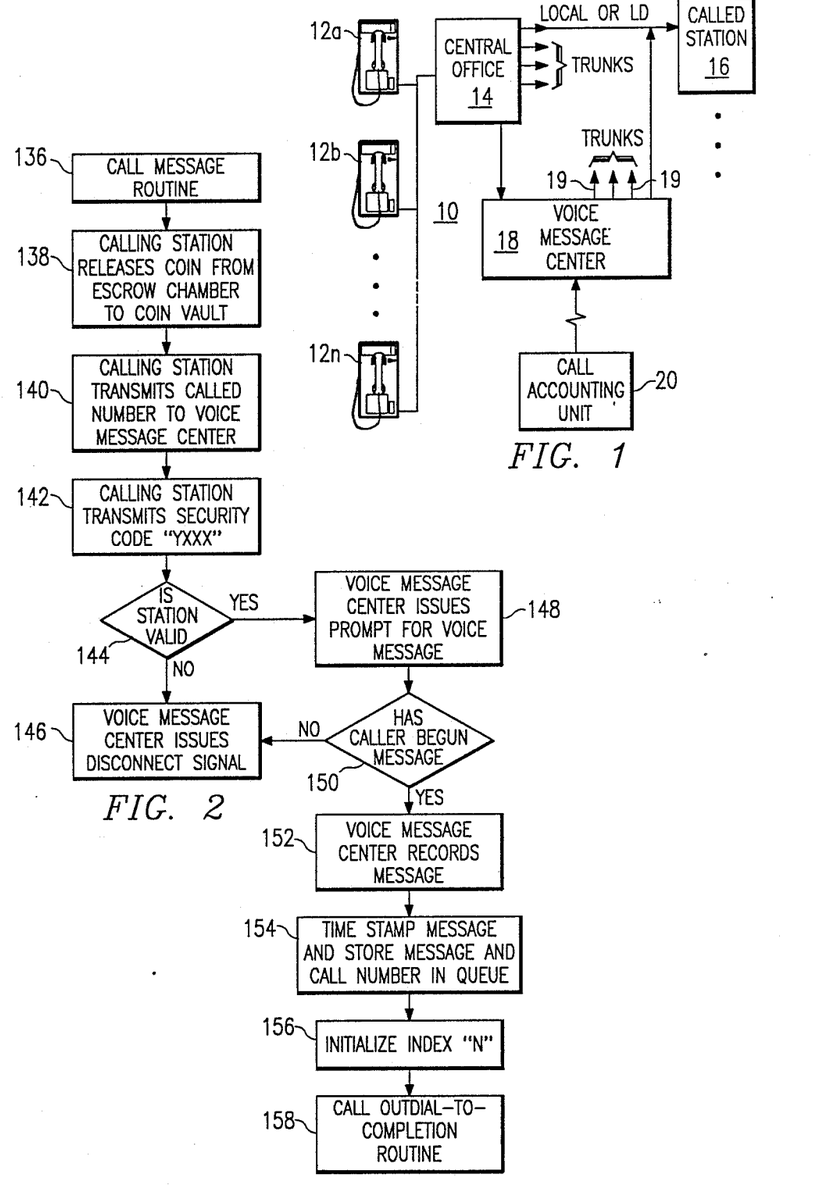
FIG. 1 is a block diagram of a multiple user station telephone system having a central office and a voice message facility.
FIG. 2 is a detailed flowchart diagram of a call routine of a voice message storage/forward method for use in a paystation system to determine whether a call can be completed from a calling station to a called station.

FIG. 1 is a block diagram of a multiple user station telephone system 10 in which a voice message storage and forwarding method has been implemented according to the teachings of U.S. Pat. No. 4,766,704 assigned to the assignee of the present application. System 10 includes a plurality of user stations 12a–12n connected to a privately conventional or private owned central office 14. Each of the user stations 12a–12n is preferably a "pre-pay" paystation and thus includes a suitable microprocessor and associated memory device (e.g., a programmable read only memory or "PROM") for storing computer programs which control the operation of the paystation. Each paystation also includes a conventional handset 15 as well as other standard components (not shown) normally associated with the coin collection process.

To initiate a call from one of the paystations 12a–12n, a caller removes the handset 15 and enters a called number. This number identifies a called station 16 which may be either a local or a long distance station. As also seen in FIG. 1, the multiple paystation system 10 includes a voice message facility 18 connected to the central office 14 for recording voice messages from the user stations 12a–12n. Voice message facility 18 has a plurality of access ports 19 from which recorded voice messages are output. The system 10 may also include a call accounting unit 20 connected to the voice message facility 18 for the purposes to be described.

Multiple user station systems such as shown in FIG. 1 as well as other telephone systems having non-pay calling stations have been enhanced by the method for receiving the delivering voice messages described in U.S. Pat. No. 4,766,604. The method exploits the inability of a calling station 12a-12n to complete a call to the called station 16 to automatically cause the called station to default to the voice message facility 18. If the caller desires to leave a voice message to be delivered to the called station 16, the caller is thereafter prompted to store the voice message. The voice message facility 18 then initiates an outdial routine which makes a predetermined number of attempts to forward the voice message to the called station. Each of these attempts are typically made at a predetermined time interval programmed by the system operator.

Referring now to FIG. 2, a flowchart diagram is shown detailing a call routine 100 of the method for receiving and delivering voice messages in a paystation embodiment as described in U.S. Pat. No. 4,766,604. The call routine 100 begins at step 102 when the calling station handset 15 goes off-hook. As described in that application, each calling station 12a-12n is preferably a "pre-pay" paystation which requires receipt of appropriate coinage before a call can be placed. Accordingly, at step 104, an inquiry is made to determine whether a coin has been received. If not, the method continues at step 105 to request that the caller deposit the appropriate coinage for the call. Upon receipt of the coinage, the method continues at step 106 to deliver the coin to a conventional coin escrow chamber of the calling station.

At step 108, the method receives and stores the called number identifying the called station 16. At step 110, the called number is transmitted over the trunk and the calling station waits for an answer detection (i.e., the called station goes off-hook). The method continues at step 112, where an inquiry is made to determine whether the call can be completed. In particular, step 112 preferably determines whether answer detection occurs within a predetermined number of rings or whether the called station is busy. If the call can be completed, the method continues at step 114 to release the coin from the coin escrow chamber into the coin vault of the calling station. At step 116, the call is completed in a normal fashion. If the result of the inquiry at step 112 indicates that answer detection has not occurred (i.e., the called station remains on-hook) within the predetermined number of rings following call initiation or that the called station is busy, the method initiates a "call default" routine 118 for determining whether the caller at the calling station desires to leave a voice message to be delivered to the called station.

Figures 3, 4:
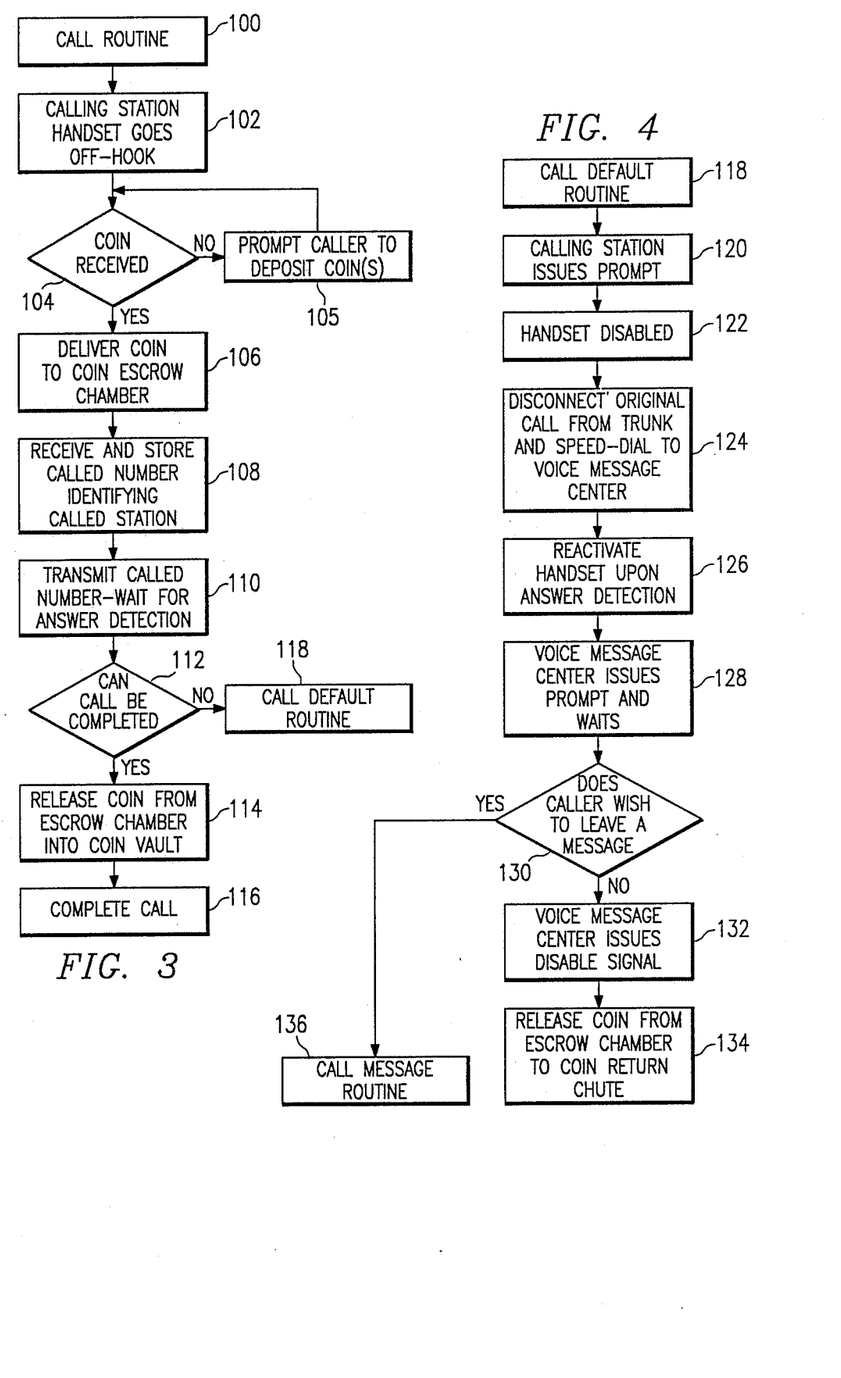
FIG. 3 is a detailed flowchart diagram of a call default routine of FIG. 2 for determining whether a caller desires to leave a voice message to be forwarded to the called station.
FIG. 4 is a detailed flowchart diagram of a call message routine of FIG. 3 for storing the voice message to be forwarded to the called station.

Referring now to FIG. 3, a detailed flowchart diagram is shown of the call default routine 118 of FIG. 2. The routine begins at step 120 wherein the calling station issues a prompt to the caller such as "Please Wait" or "One Moment Please". A bilingual prompt may also be issued at step 120 if desired. At step 122, the handset of the calling station is disabled. The call default routine 118 continues at step 124 wherein the original call is disconnected from the trunk and a "speed-dial" is initiated to the voice message facility 18. The muting of the handset at step 122 is advantageous because step 124 disconnects the original call from the trunk. If the handset were not muted, the caller would otherwise hear a dialtone and the voice message facility 18 could be accessed via a "black box" or other illegal means.

The call default routine 118 continues at step 126 with the handset of the calling station reactivated upon receipt of a predetermined signal, e.g., a DTMF (dual tone multifrequency) signal identifying the "#" key, from the voice message facility. At step 128, the voice message center issues a prompt to the caller and waits for an appropriate response. Although not meant to be limiting, the following prompt is issued at step 128:

"This is a voice message center. Your party is not available at this time. If you would like to leave a 20 second message at no additional charge, press the "#" key and I will attempt to deliver your message every 15 minutes for the next two hours. If you do not wish to leave a message, hang up, and I will return your money."

The call default routine 118 continues at step 130 to determine whether the caller desires to leave a voice message for the called station. In operation, step 130 waits for reception of a DTMF signal identifying the "#" key within a set period of time, e.g., 15-20 seconds. If the timer at step 130 times out (indicating that the caller does not wish to leave a voice message) the call default routine 118 continues at step 132 with the voice message facility 18 sending a "disable" signal to the calling station. At step 134 in the paystation embodiment, the coin located in the coin escrow chamber is released to a coin return chute of the calling station and the call is terminated. If the result of the inquiry 130 is positive, the method continues by calling a "call message" routine 136 for storing the voice message to be delivered to the called station.

Referring now to FIG. 4, a detailed flowchart diagram is shown of the call message routine 136 of FIG. 3. The routine begins at step 138 wherein, in the paystation embodiment, the calling station releases the coin from the coin escrow chamber into the coin vault of the calling station. At step 140, the calling station transmits the called number to the voice message facility 18. The call message routine 136 continues at step 142 wherein the calling station transmits a preferably four digit security code "YXXX" to ensure that the calling station is entitled to transmit messages to the voice message facility. Preferably, the first digit "Y" of the security code is a DTMF combination of a dialtone and the "#" key. The remaining three digits "XXX" of the security code are preferably a number which uniquely identifies the calling station.

At step 144, the received security code is evaluated to determine whether the calling station is entitled to transmit messages to the voice message facility 18. If the calling station is invalid, the call message routine 136 issues a disconnect signal to the calling station at step 146, thereby disconnecting the calling station from the voice message facility 18. If the result of the inquiry 144 indicates that the calling station is valid, the voice message facility 18 issues a prompt at step 148 to request that the caller begin the message. For example, the prompt at step 148 may state:

"Please state your name and your 20 second message now."

At step 150, an inquiry is made to determine whether the caller has begun recording the message within a predetermined time, e.g., 5 seconds. If the caller has not begun recording the message within the predetermined time, the call message routine 136 issues a salutation and then generates a disconnect signal at step 146.

If the result of the inquiry at step 150 is positive, the voice message facility 18 records the spoken message at step 152. At step 154, the call message routine 136 time-stamps the message and stores the message and the called number transmitted at step 140 in a call queue. As used herein, the phrase "time-stamps" means that the message and the called number are placed in the call queue (i.e., a suitable memory device of the voice message center) at an address uniquely associated with the time that the caller began recording the message. At step 156, an index "N" for the message is initialized. The index "N" represents a number of outdial attempts to be performed by the voice message center 18 as will be described. The call message routine 136 terminates at step 158 by calling an "outdial-to-completion" routine which is used to attempt delivery of the stored voice message to the called station.

The outdial to completion routine attempts to forward each stored message at a predetermined time interval (and multiples thereof) from the time the message is stored in the call queue. The message may be forwarded redundantly to insure delivery to the calling party. Alternatively, the message is forwarded once after a short time delay (e.g., 2–3 seconds) to insure that the calling party is attentive prior to delivery.

Figure 5:
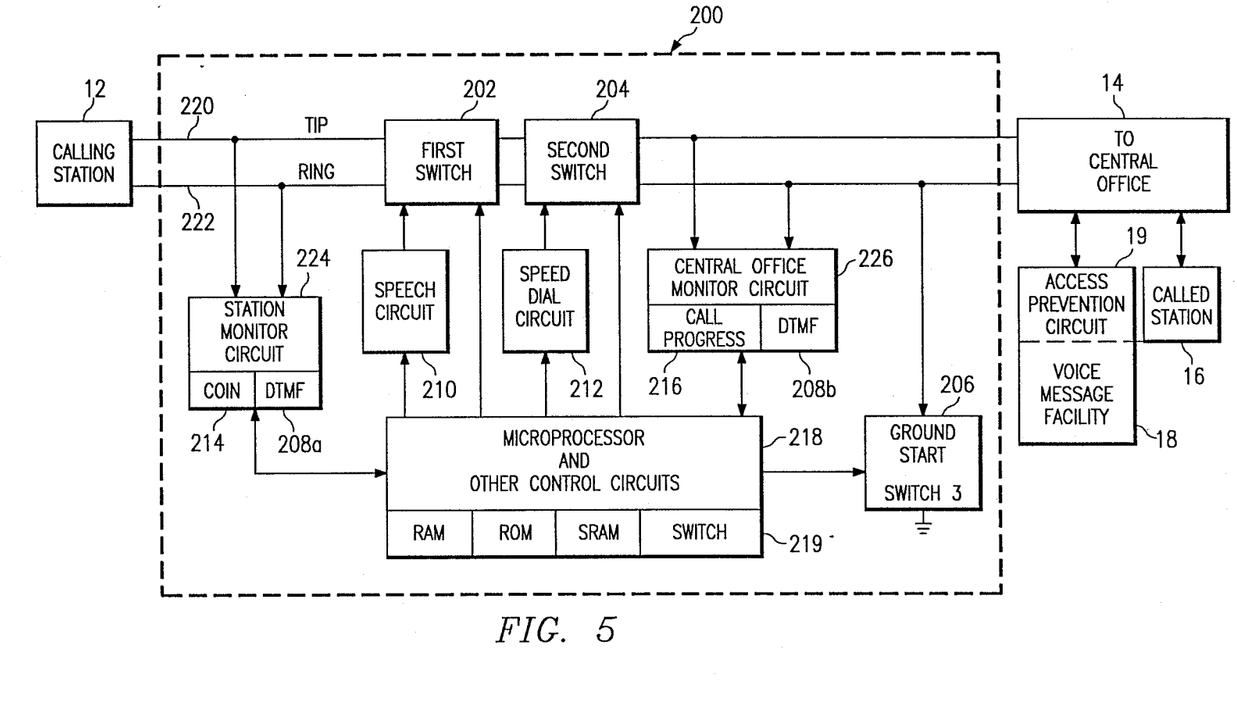
FIG. 5 is a simplified block diagram of a line interface unit according to the present invention.

While the invention described in U.S. Pat. No. 4,766,604 has proven satisfactory, it has been found desirable to provide certain enhancements and improvements to the voice messaging method described therein. Referring now to FIG. 5, a line interface unit 200 is shown for providing enhanced control of receipt and delivery of voice messages over a telephone system having a voice message facility 18 connectible to at least one calling station 12 and a called station 16 via a central office 14. As will be described, the line interface unit 200 advantageously provides certain call default and message prompting operations in a standalone unit both externally to the calling station 12 and the voice message facility 18. The interface unit may be located adjacent to the calling station or on the input side of the central office switching equipment.

As seen in FIG. 5, and as more particularly described in U.S. Pat. No. 4,825,460 assigned to the assignee of the present invention, the line interface unit 200 comprises a plurality of functional modules including first, second and third switches 202, 204 and 206, respectively, DTMF detector circuits 208a and 208b, a speech circuit 210, a speed-dial circuit 212, a coin detect circuit 214, a call progress detector circuit 216, a control circuit 218, a calling station monitor circuit 224 and a central office monitor circuit 226. The control circuit 218 is preferably a microprocessor-based controller having suitable control programs for effecting the operations described below. The control circuit 218 is connected to control the first, second and third switches 202, 204 and 206, as well as the speech circuit 210 and the speed-dial circuit 212. The speech circuit 210, the speed-dial circuit 212 and/or the control circuit 218 may be shared by a plurality of line interface units each having the disclosed switching and monitoring components.

As described in U.S. Pat. No. 4,825,460, each of the first and second switches are a double-pole, double-throw switch located in the tip and ring lines 220 and 222 between the calling station 12 and the central office 14. In particular, the first switch 202 is connected to the calling station 12 in the tip and ring lines 220 and 222 and the second switch 204 is connected to the central office 14 in the tip and ring lines. Each of the switches 202 and 204 have first and second positions such that signals on the tip and ring lines 220 and 222 are connected directly between the calling station 12 and the central office 14 when each of these switches are in the first position. The unit is thus "idle" when the switch contacts of the first and second switches 202 and 204 are in their first position. However the line interface unit 200 communicates directly with the calling station 12 when the first switch 202 is switched from its first position to its second position. Likewise, the line interface unit communicates directly with the central office 14 when the second switch 204 is switched from its first position to its second position. The unit 200 thus communicates with both the calling station 12 and the central office 14 when the switch contacts of switches 202 and 204 are activated to the second positions. When both switches are in their second position, a small amount of crosstalk between the switches 202 and 204 exists and is advantageously used by the interface unit 200 for the purposes described below. Because of the placement of the switches 202 and 204 in the tip and ring lines 220 and 222, it should be appreciated that switching of the first switch 202 from its first position to its second position causes the handset of the calling station to be disconnected from the central office 14. Likewise, switching of the second switch 204 between its first and second positions automatically disconnects the calling station from the central office 14 and reorders dialtone to the line interface unit 200.

As noted above, the line interface unit 200 also includes the speech circuit 210 for issuing one o more predetermined (English or bilingual) prompts to the caller at the calling station 12. For example, the speech circuit is controlled by the control circuit 218 to issue a prompt to determine whether the caller at the calling station desires to leave a voice message for a called station. If the caller desires to leave a voice message, the control circuit 218 operates to control the speed-dial circuit 212 for speed dialing the voice message facility 18. The control of this operation is effected through sensing of various signals by the line monitor circuits 224 and 226.

In particular, the calling station monitor 224 is connected across the tip and ring lines 220 and 222 adjacent the calling station side of the unit 200. Likewise, the central office monitor circuit 226 is connected across the tip and ring lines adjacent to the central office side of the interface unit 200. The calling station monitor 224 monitors the tip and ring lines for coin detect signals (which are processed by the coin detect circuit 214) or receipt of a predetermined DTMF signal (e.g., a "#" key) from the calling station (which is processed by the DTMF detector circuit 208a). The central office station monitor 226 monitors the tip and ring lines for detecting a predetermined condition at the called station (e.g., a busy/no answer condition) upon call initiation to the called station. Central office monitor circuit 226 also monitors the tip and ring lines for detecting receipt of standard or non standard DTMF signaling which is then processed by the DTMF detected circuit 208b. The control circuit 218 includes a switch 219 for selectively switching the outputs of the DTMF detector circuits 208a and 208b to the control circuit 218.

Although not meant to be limiting, preferably the DTMF detector circuit 208a senses receipt (over the calling station monitor 224) of standard DTMF signal indicating that the caller at the calling station desires to leave a voice message for the called station. Alternatively, the caller can deposit additional coinage or pull a credit card through a cardreader to indicate his/her intention to record a voice message. The DTMF detector circuit 208b senses receipt (over the central office monitor 226) of a non standard DTMF signal from the voice message facility following the speed dialing thereto as will be described in more detail below.

The third switch 206 of the line interface unit is connected between the ring line 222 and ground for the purpose of generating a ground start after the speed dial circuit 212 has speed-dialed the voice message facility. This ground start is required to enable the interface unit 200 to complete a connection to the voice message facility 18 through the central office without the caller having to deposit additional coinage in the paystation. As also seen in FIG. 5, the line interface unit 200 includes the coin detect circuit 214 for detecting receipt of coinage in the paystation. Coin detect circuit 214 is preferably coupled to the control circuit 218 to provide a running total of all coins deposited in the calling station over a predetermined time. Moreover, the control circuit 218 can be remotely reprogrammed (e.g., to change the prompt, the language of the prompt, the calling station identification or the number of unanswered rings at the called station which will initiate a call default) through DTMF signaling from a host or handset. To effect reprogramming, the second switch 204 is switched to its second position and the parameter information is down loaded to the microprocessor.

In operation, the control circuit 218 responds to a busy/no answer condition at the called station (following call initiation thereto) for switching the first switch 202 from its first position to its second position. This operation disconnects the calling station handset from the central office and connects the speech circuit 210 to the calling station 12 for issuing the prompt to determine if the caller desires to leave a voice message. After the prompt is issued, the calling station monitor circuit 224 waits for receipt of the DTMF signal from the calling station (or, alternatively, waits for receipt of additional coinage). If no DTMF signal is received (i.e., if the caller does not desire to leave a voice message), the unit 200 remains idle. However, upon detection of the DTMF signal by the DTMF detector circuit 208a (or the detection of additional coinage by coin detector 214 as the case may be), the control circuit 218 responds by switching the second switch 204 from its first position to its second position. This switching reorders dialtone and connects the speed-dial circuit 212 to the central office 14 for dialing the voice message facility 18. The central office monitor circuit 226 then waits for receipt of the DTMF signal from the voice message facility. The control circuit 218 then responds to detection of the DTMF signal by the DTMF detector circuit 208b for effecting a "handshake" to the voice message facility and then switching the first and second switches 202 and 204 from their respective second positions back to their respective first positions to thereby connect the calling station 12 to the voice message facility 18.

As noted above, when the calling station 12 is a paystation, the line interface unit 200 must present a ground start to the central office 14 in order to dial the voice message facility 18 without additional coinage. To this end, the control circuit 218 operates to activate the third switch 206 connected between the ring line 222 and ground for generating a ground start after the voice message facility 18 has been dialed by the speed-dial circuit 212. This ground start is typically performed immediately after the last digit of the voice message facility is dialed by the speed dial circuit and enables the interface unit to complete a connection to the message facility without the caller having to deposit additional coinage. After the ground start, the control circuit 218 is responsive to receipt of the preferably non standard DTMF signal from the voice message facility 18 for switching the first and second switches from their respective second positions back to their respective first positions. This operation connects the calling paystation to the voice message facility. The use of non standard DTMF signaling increases security of the transmissions between the calling station and the voice message facility.

In the paystation embodiment, it should be appreciated that switching of the first switch 202 to the second position (e.g., in response to a busy/no answer condition at the called station) causes the central office 14 to issue a 130V "coin return" signal to the paystation. This signal, however, cannot reach the calling station because the first switch is in the second position. Accordingly, when the caller at the calling station does not desire to leave a voice message for the called station, the line interface unit 200 must cause the central office to issue another "coin return" signal. Otherwise, the caller will not obtain his/her coinage back from the paystation. This "coin return" operation is achieved according to the invention when the caller goes "on hook" (indicating that the caller does not desire to leave a voice message). In particular, at that time the control circuit 218 switches the second switch 204 to its second position to reorder dialtone from the central office 14. Thereafter, the first switch 202 is switched back to its first position. After the central office monitor circuit 226 senses dialtone, the control circuit 218 switches the second switch back to its first position. To the central office 14 this operation emulates the calling station going off hook and then on hook. The central office 14 thus again issues a "coin return" signal; however, this signal is not passed through the "idle" line interface unit to the calling station. The caller's original coinage is then returned.

Figure 6:
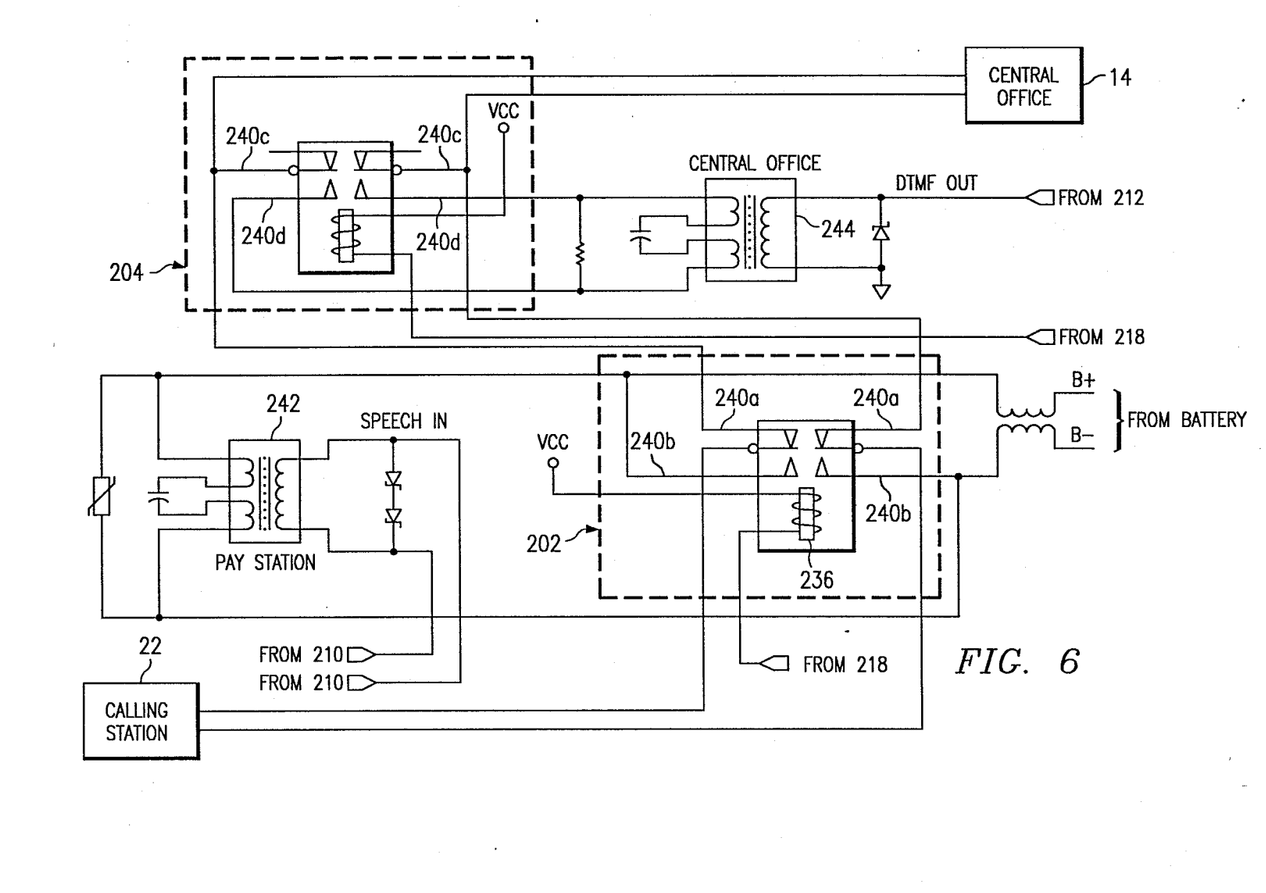
FIG. 6 is a detailed schematic diagram of the first and second switch means of FIG. 5.

In yet another embodiment, the line interface unit provides a so-called "voice over" operation wherein the caller at the calling station 12 is allowed to continue to monitor the call progress (i.e., the ringing on the line) while being prompted to leave a message. In this embodiment, the control circuit 218 is responsive to a predetermined condition at the called station (e.g., three (3) rings with no answer) for switching the first and second switches from their respective first positions to their respective second positions. This operation connects the speech circuit 210 to the calling station 12 for issuing the prompt while simultaneously enabling the caller at the calling station to continue to monitor the progress of the call. This operation is effected by the crosstalk between the first and second switch transformers as best seen in FIG. 6, which is a detailed schematic diagram of the switches 202 and 204. In particular, first switch 202 includes a control relay 236 controlled by the control circuit 218 for switching the switch between the sets 240a and 240b of switch contacts. When the switch is in the second position (across contacts 240b), the speech circuit 210 is coupled to the calling station via the line transformer 242. Likewise, when the second switch is in its second position (across contacts 240d), the speed-dial circuit 212 is coupled to the central office and thus the voice message facility via the line transformer 244. Crosstalk between the line transformers 242 and 244 enables the voice over operation to be effected.

After the prompt is issued during the voice-over operation, the control circuit 218 is responsive to receipt of a DTMF signal from the calling station 12 for switching the second switch from its second position to its first position and then back to its second position. This operation reorders dialtone to the interface unit 200 and then connects the speed-dial circuit 212 to the central office for dialing the voice message facility 18. After dialing the voice message facility, the control circuit is responsive to receipt of the DTMF signal from the voice message facility for switching the first and second switches from their respective second positions back to their respective first positions and thereby connect the calling station to the voice message facility.

Before the first and second switches are returned to their first position to connect the calling station to the voice message facility, the line interface unit 200 performs a "handshake" with the voice message facility 18. In particular, the control circuit 218 transmits a predetermined data string to the voice message facility 18. This data string may have the following format—"#", "#", (10-digit number of calling station, "#", (1-digit activity code), "#", (called station number), "#"—. The data string may also include a credit card number or other billing information. The "#" sign delimits the fields of the data string. The activity code informs the voice message facility 18 or other host that an alternative prompt has been made (e.g., a bilingual prompt). Alternatively, the activity code is a special code indicating that connection is required to an alternate voice message facility, that the calling station includes a facsimile apparatus, that certain coinage has been deposited or that certain keypad signals have been received indicating acceptance of the service. One or more of the "#" signs at the beginning of the data string described above may alternatively be non-standard DTMF signaling (such as an "A") for increased security. When the voice message facility receives the data string, it transmits an "acknowledge" signal (e.g. an "*") back to the unit or requests retransmission if the data has not been received. Upon receipt of the acknowledge signal, the control circuit 218 switches the first and second switches back to their respective first positions.

The voice message facility may include access prevention circuitry and/or algorithms to prevent receipt and/or forwarding of voice messages unless predetermined access codes are presented to the system. In this case, the data string from the interface unit 200 should then include a predetermined "key" that "unlocks" the voice message facility's access prevention circuits and algorithms. According to the present invention, the "key" provided to unlock the voice message facility is preferably part of the data string transmitted to the facility during the handshake process. In particular, but without limitation, the "key" comprises three elements: the number of the calling station or "ANI", a predetermined number of digits representing the destination number, and some billing information for use in billing the user of the calling station for the caller-controlled message delivery service. The access prevention circuitry of the voice message facility is then pre programmed to search for a data string with these components. The actual destination number is not relevant as long as the data string includes the proper number of digits for this number. If a data string received by the message center does not include these components in the required predetermined order and/or without the proper number of expected digits, no acknowledge signal is returned to the interface unit and the unit is disconnected from the message center. If the data string includes the proper "key," however, the voice message facility becomes "barrierless" to the voice message subsequently transmitted from the calling station. The stored voice message can then be subsequently forwarded without input of the access codes normally required by the voice-mail system.

While in the preferred embodiment the line interface unit 200 is adapted for use with a single calling station, a plurality of calling stations may be selectively switched to a single interface unit. Moreover, although not discussed in detail, it should be appreciated that other forms of signaling may be used in the invention. For example, the control circuit 218 may include appropriate circuitry for processing FSK signaling if desired. Further, the control circuit 218 of the line interface unit 200 may alternatively include appropriate software to perform automatic number identification ("ANI") following the caller's affirmative decision to leave a voice message. This ANI function is advantageous when the calling station and the called station are intralata.

Figure 7:
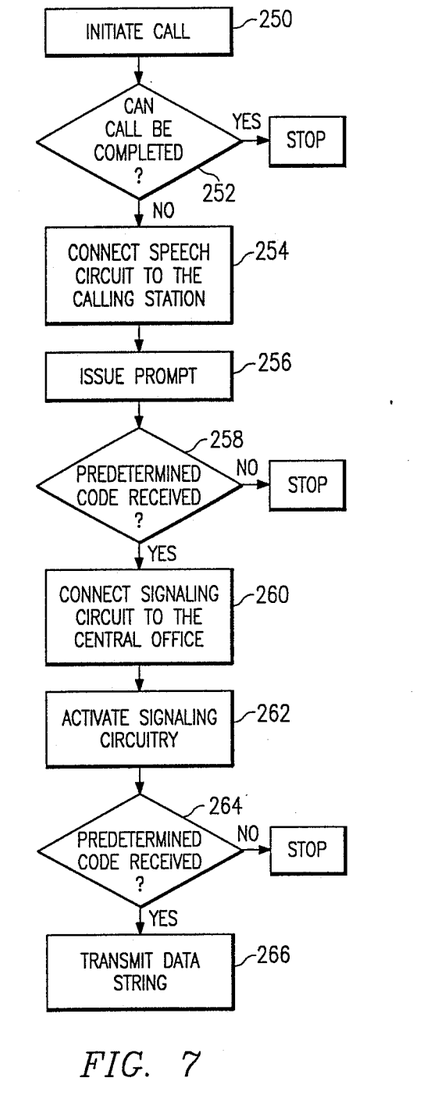
FIG. 7 is a flowchart diagram of a method for controlling receipt and delivery of voice messages according to the invention.

With reference now to FIG. 7, a flowchart is shown of a method for controlling receipt of voice messages according to the present invention. The method uses the line interface unit 200 as described above as well as the voice message facility 18, which normally includes access prevention circuitry 19 (as shown in FIG. 5) for preventing storage of voice messages unless predetermined access codes are received and verified by the access prevention circuitry.

The method begins at step 250 when a call is initiated to the called station. At step 252, a test is made to determine, using the monitor and detector circuits of the line interface unit, whether a predetermined condition (e.g., busy/no answer or ring/no answer) exists at the called station. If the predetermined condition exists (i.e., if the call cannot be completed), the method continues at step 254 by connecting the speech circuit 210 to the calling station to thereby enable the speech circuit to issue the prompt. At step 256, the speech circuit is activated, under the control of the control circuit 218, to issue the prompt to the caller at the calling station. A test 258 is then made to determine, using the monitor and detector circuits, whether a predetermined code has been received from the calling station indicating that the caller desires to leave a voice message for the called station. If the predetermined code has been received from the calling station, the method continues at step 260 to connect the signaling circuit 212 to the central office to thereby enable the signaling circuit to signal the voice message facility. At step 262, the signaling circuit is activated, under the control of the control circuit, to signal the voice message facility. Thereafter, at step 264, a test is made to determine, using the monitor and detector circuits, whether a predetermined code has been received from the voice message facility. If the predetermined code has been received from the voice message facility, the method continues at step 266 to transmit a predetermined data string from the line interface unit to the voice message facility. As noted above, preferably the predetermined data string including information that, once recognized by the access prevention circuitry 19 means of the voice message facility, enables the voice message to be stored and forwarded from the voice message facility without entry of the predetermined access codes normally required by the access prevention circuitry.

Although the invention has been described and illustrated in detail, it should be appreciated that the same is by way of illustration and example only. The spirit and scope of the present invention are to be limited only by the terms of the appended claims.

We claim:

1. A line interface unit for controlling receipt and delivery of voice messages over a telephone system having a voice message facility, the voice message facility connectible to at least one calling station and a called station and normally having access prevention means for preventing storage and forwarding of voice messages unless predetermined access codes are received and verified by the access prevention means, the calling station connected to a central office, comprising:

a switch connected to the central office and having first and second positions and wherein signals are connected directly between the calling station and the central office when the switch is in the first position;

means for signaling the voice message facility;

means for monitoring call progress upon call initiation to the called station;

means connected to the monitoring means for detecting a predetermined condition at the called station upon call initiation to the called station, for detecting receipt of a first predetermined code from the calling station indicating that the caller desires to leave a voice message for the called station at the caller's expense, and for detecting receipt of a second predetermined code from the voice message facility;

control means connected to the detecting means and the switch, the control means responsive to receipt of the first predetermined code from the calling station for switching the switch from its first position to its second position to enable the signaling means to signal the voice message facility;

wherein after signaling the voice message facility the control means is responsive to receipt of the second predetermined code from the voice message facility for switching the switch from its second position back to its first position to connect the calling station to the voice message facility; and wherein after connection of the calling station to the voice message facility the control means transmits a predetermined data string to the voice message facility, the predetermined data string including information that, once recognized by the access prevention means of the voice message facility, enables the voice message to be stored and forwarded from the voice message facility without entry of the predetermined access codes normally required by the access prevention means.

2. The line interface unit as described in claim 1 wherein the predetermined data string comprises a number of the calling station, a predetermined number of digits representing a destination number of the called station, and billing information for use in billing the calling station.

3. A method, using a line interface unit, for controlling receipt and delivery of voice messages over a telephone system having a voice message facility connectible to at least one calling station and a called station via a central office, the voice message facility normally having access prevention means for preventing storage of voice messages unless predetermined access codes are received and verified by the access prevention means, wherein the line interface unit includes a monitor circuit for monitoring tip and ring lines of the calling station, a speech circuit for issuing a predetermined prompt to a caller at the calling station, a signaling circuit for signaling the voice message facility, a detector circuit connected to the monitor circuit for detecting signals on the tip and ring lines and a control circuit for controlling the operation of the line interface unit, comprising the steps of:

(a) determining, using the monitor circuit and the detector circuit, whether a predetermined condition exists at the called station upon call initiation to the called station;

(b) if the predetermined condition exists, connecting the speech circuit to the calling station to thereby enable the speech circuit to issue the prompt;

(c) activating, under the control of the control circuit, the speech circuit to issue the prompt to the caller at the calling station;

(d) determining, using the monitor circuit and the detector circuit, whether a predetermined code has been received from the calling station indicating that the caller desires to leave a voice message for the called station;

(e) if the predetermined code has been received from the calling station, connecting the signaling circuit to the central office to thereby enable the signaling circuit to signal the voice message facility;

(f) activating, under the control of the control circuit, the signaling circuit to signal the voice message facility;

(g) determining, using the monitor circuit and the detector circuit, whether a predetermined code has been received from the voice message facility; and (h) if the predetermined code has been received from the voice message facility, transmitting a predetermined data string from the line interface unit to the voice message facility, the predetermined data string including information that, once recognized by the access prevention means of the voice message facility, enables the voice message to be stored and forwarded from the voice message facility without entry of the predetermined access codes normally required by the access prevention means.

4. The method as described in claim 3 wherein the predetermined data string comprises a number of the calling station, a predetermined number of digits representing a destination number of the called station, and billing information for use in billing the calling station.

5. A method, using a line interface unit, for controlling receipt and delivery of voice messages over a telephone system having a voice message facility connectible to at least one calling station and a called station via a central office, the line interface unit including a monitor circuit for monitoring tip and ring lines of the calling station, a speech circuit for issuing a predetermined prompt to a caller at the calling station, a signaling circuit for signaling the voice message facility, a detector circuit connected to the monitor circuit for detecting signals on the tip and ring lines and a control circuit for controlling the operation of the line interface unit, comprising the steps of:

(a) determining, using the monitor circuit and the detector circuit, whether a busy or ring/no answer condition exists at the called station upon call initiation to the called station;

(b) if a busy or ring/no answer condition exists, connecting the speech circuit to the calling station to thereby enable the speech circuit to issue the prompt;

(c) activating the speech circuit to issue the prompt to the caller at the calling station;

(d) determining, using the monitor circuit and the detector circuit, whether a predetermined code has been received from the calling station indicating that the caller desires to leave a voice message for the called station;

(e) if the predetermined code has been received from the calling station, connecting the signaling circuit to the central office to thereby enable the signaling circuit to signal the voice message facility;

(f) activating the signaling circuit to signal the voice message facility;

(g) determining, using the monitor circuit and the detector circuit, whether a predetermined code has been received from the voice message facility; and (h) if the predetermined code has been received from the voice message facility, transmitting a predetermined data string from the line interface unit to the voice message facility, the predetermined data string including a telephone number of the calling station and a destination number of the called station.

* * * * *